US010678361B2

(12) United States Patent
Zhang et al.

(10) Patent No.: US 10,678,361 B2
(45) Date of Patent: Jun. 9, 2020

(54) TOUCH CIRCUIT, TOUCH ARRAY CIRCUIT AND METHOD FOR DRIVING THE SAME, AND DISPLAY PANEL

(71) Applicants: Beijing BOE Display Technology Co., Ltd., Beijing (CN); BOE Technology Group Co., Ltd., Beijing (CN)

(72) Inventors: Kan Zhang, Beijing (CN); Bin Zhang, Beijing (CN); Dianzheng Dong, Beijing (CN); Qiang Zhang, Beijing (CN); Pengming Chen, Beijing (CN); Yu Xie, Beijing (CN); Guangxing Wang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/333,808

(22) PCT Filed: Mar. 7, 2018

(86) PCT No.: PCT/CN2018/078271
§ 371 (c)(1),
(2) Date: Mar. 15, 2019

(87) PCT Pub. No.: WO2018/192317
PCT Pub. Date: Oct. 25, 2018

(65) Prior Publication Data
US 2019/0258348 A1    Aug. 22, 2019

(30) Foreign Application Priority Data
Apr. 20, 2017 (CN) .......................... 2017 1 0261121

(51) Int. Cl.
*G06F 3/041*  (2006.01)
*G06F 3/046*  (2006.01)

(52) U.S. Cl.
CPC ............ *G06F 3/0412* (2013.01); *G06F 3/046* (2013.01); *G06F 3/04144* (2019.05); *G06F 3/04166* (2019.05); *G06F 2203/04101* (2013.01)

(58) Field of Classification Search
CPC .... G06F 3/0412; G06F 3/046; G06F 3/04144; G06F 3/04166; G06F 3/0416; G06F 2203/04101
See application file for complete search history.

(56) References Cited

U.S. PATENT DOCUMENTS

2012/0306824 A1* 12/2012 Horie ................. G06F 3/03545
                                                    345/179
2018/0203059 A1*  7/2018 Sacco ....................... G01D 3/08
(Continued)

FOREIGN PATENT DOCUMENTS

CN       103282988 A    9/2013
CN       105338685 A    2/2016
(Continued)

OTHER PUBLICATIONS

International Search Report and Written Opinion (including English translations of search report and Box V of the Written Opinion) for International Application No. PCT/CN2018/078271, dated May 14, 2018, 10 pages.

*Primary Examiner* — Kent W Chang
*Assistant Examiner* — Andrew Lee
(74) *Attorney, Agent, or Firm* — Westman, Champlin & Koehler, P.A.

(57) ABSTRACT

The present disclosure provides a touch circuit, a touch array circuit and a method for driving the same, and a display panel. The touch circuit includes: a first resistor, a second resistor, a control sub-circuit, a third resistor, a strain resistor and a Hall element. The first resistor is connected to a first scanning signal terminal, the control sub-circuit, the second (Continued)

resistor and the Hall element. The second resistor is further connected to a first level terminal and the third resistor. The control sub-circuit is further connected to the strain resistor and a second scanning signal terminal. The strain resistor is further connected to the third resistor and the Hall element. The Hall element is further connected to an inductive voltage output terminal.

20 Claims, 4 Drawing Sheets

(56) References Cited

U.S. PATENT DOCUMENTS

2018/0246598 A1\* 8/2018 Sainis .................. G02F 1/1685
2019/0258348 A1    8/2019 Zhang et al.

FOREIGN PATENT DOCUMENTS

CN          107422897 A    12/2017
KR       2001-0094449 A    11/2001

\* cited by examiner ized signals to first scanning signal terminals of different rows of touch circuits.

TOUCH CIRCUIT, TOUCH ARRAY CIRCUIT AND METHOD FOR DRIVING THE SAME, AND DISPLAY PANEL

CROSS-REFERENCE TO RELATED APPLICATION(S)

This application is a Section 371 National Stage application of PCT/CN2018/078271, filed on 7 Mar. 2018, which published as WO 2018/192317 A1 on 25 Oct. 2018, and claims priority to the Chinese Patent Application No. 201710261121.5, filed on Apr. 20, 2017, the contents of which are incorporated herein by reference in their entireties.

TECHNICAL FIELD

The present disclosure relates to the field of touch technology, and more particularly, to a touch circuit, a touch array circuit and a touch detection method thereof, and a display panel.

BACKGROUND

Photosensitive touch display panels is one type of touch display panels. In an existing photosensitive touch display panel, an array of Infrared Radiation (IR for short) Light Emitting Diodes (LEDs for short) is used on two adjacent slopes of a display, and photosensitive elements are placed at edges of slopes opposite to the two adjacent slopes. A touch action is determined by analyzing infrared light emitted by the IR LEDs and received by the photosensitive elements. However, the photosensitive touch display panel has a problem that touch sensing is not high in accuracy during practical applications at least because infrared light in an environment may be irradiated to the photosensitive elements to generate interference inductive current and ambient temperature may have an influence on impedance of a photosensitive material.

SUMMARY

According to a first aspect of the present disclosure, there is provided a touch circuit. The touch circuit comprises a first resistor, a second resistor, a control sub-circuit, a third resistor, a strain resistor and a Hall element, wherein the first resistor has a first terminal electrically connected to a first scanning signal terminal and an input terminal of the control sub-circuit, and a second terminal electrically connected to a first terminal of the second resistor and a first voltage input terminal of the Hall element, a second terminal of the second resistor is electrically connected to a first level terminal and a first terminal of the third resistor, the control sub-circuit has an output terminal electrically connected to a first terminal of the strain resistor, and a control terminal electrically connected to a second scanning signal terminal, a second terminal of the strain resistor is electrically connected to a second terminal of the third resistor and a second voltage input terminal of the Hall element, and a voltage output terminal of the Hall element is electrically connected to an inductive voltage output terminal.

In one embodiment, when the strain resistor is not stress-deformed, resistance values of the first resistor, the second resistor, the third resistor, and the strain resistor satisfy the following formula:

$$R1/R2=Rf/R3,$$

where R1 is the resistance value of the first resistor, R2 is the resistance value of the second resistor, R3 is the resistance value of the third resistor, and Rf is the resistance value of the strain resistor.

In one embodiment, the control sub-circuit is a thin film transistor. The thin film transistor has one of a source and a drain acting as the input terminal of the control sub-circuit, the other of the source and the drain acting as the output terminal of the control sub-circuit, and a gate acting as the control terminal of the control sub-circuit.

According to a second aspect of the present disclosure, there is provided a touch array circuit. The touch array circuit comprises touch circuits according to various embodiments in the first aspect which are arranged in an array.

In one embodiment, touch circuits in a same row of the array connect to a common first scanning signal terminal; and touch circuits in a same column of the array connect to a common second scanning signal terminal and a common inductive voltage output terminal.

In one embodiment, the plurality of touch circuits in the touch array circuit connect to a common first level terminal.

In one embodiment, touch circuits in a same row of the array connect to a common first resistor, a common second resistor, and a common third resistor.

According to a third aspect of the present disclosure, there is provided a method for performing touch detection on the touch array circuit according to various embodiments in the second aspect. The method comprises: inputting first scanning signals to first scanning signal terminals, and inputting second scanning signals to second scanning signal terminals, wherein a level at which a control sub-circuit is turned on is sequentially input to the second scanning signal terminals of different columns of touch circuits; applying magnetic fields to Hall elements, and detecting voltages at inductive voltage output terminals; and determining occurrence of a touch and a position where the touch occurs according to the detected voltages at the inductive voltage output terminals.

In one embodiment, the step of applying magnetic fields to Hall elements comprises applying a magnetic field to a Hall element corresponding to a second scanning signal terminal to which the level at which the control sub-circuit is turned on is being input.

According to a fourth aspect of the present disclosure, there is provided a method for performing touch detection on the touch array circuit according to various embodiments in the second aspect. The method comprises: inputting first scanning signals to first scanning signal terminals, and inputting a level at which a control sub-circuit is turned on to all second scanning signal terminals in the touch array circuit; detecting voltages at inductive voltage output terminals; and determining occurrence of a touch and a position where the touch occurs according to the detected voltages at the inductive voltage output terminals.

In one embodiment, the step of inputting first scanning signals to first scanning signal terminals comprises sequentially inputting a level at which a potential difference is generated across a Hall element to first scanning signal terminals of different rows of touch circuits.

According to a fifth aspect of the present disclosure, there is provided a display panel comprising the touch array circuit according to various embodiments in the second aspect.

BRIEF DESCRIPTION OF THE ACCOMPANYING DRAWINGS

In order to more clearly illustrate the technical solutions in the embodiments of the present disclosure or the existing techniques, the accompanying drawings to be used in the description of the embodiments or the existing techniques will be briefly described below. It is obvious that the accompanying drawings in the following description are only some of the embodiments of the present disclosure, and other accompanying drawings may be obtained by those of ordinary skill in the art according to these accompanying drawings without any creative work.

DETAILED DESCRIPTION

The technical solutions in the embodiments of the present disclosure will be clearly and completely described below with reference to the accompanying drawings in the embodiments of the present disclosure. It is obvious that the embodiments of the present disclosure are only a part of the embodiments of the present disclosure, instead of all the embodiments. All other embodiments obtained by those of ordinary skill in the art based on the embodiments of the present disclosure without any creative work fall within the protection scope of the present disclosure.

It should be illustrated that the words "first", "second" etc. in the present application are only used to distinguish different objects from each other, and are not used to describe a specific order. For example, a first resistor and a second resistor are used to distinguish different resistors from each other, and are not used to describe a particular order of the resistors.

In the embodiments of the present disclosure, the words "exemplary" or "example" etc. are used to mean being used as an example, instance, or illustration. Any embodiment or solution described as "exemplary" or "example" in the embodiments of the present disclosure should not be construed as being preferred or advantageous over other embodiments or solutions. Rather, the words "exemplary" or "example" etc. is intended to present a relative concept in a specific manner.

Figure 1:
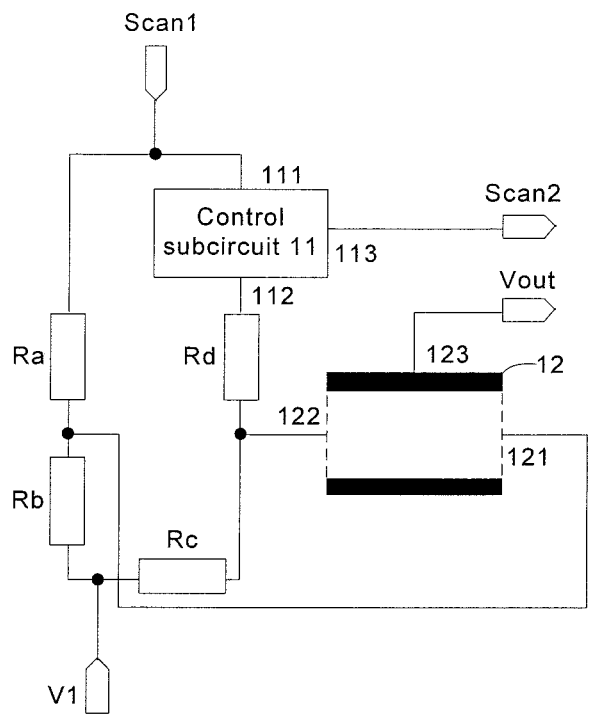
FIG. 1 is a schematic structural diagram of a touch circuit according to an embodiment of the present disclosure.

As shown in FIG. 1, the embodiments of the present disclosure provide a touch control circuit including: a first resistor Ra, a second resistor Rb, a control sub-circuit 11, a third resistor Rc, a strain resistor Rd, and a Hall element 12.

Here, the first resistor Ra has a first terminal electrically connected to a first scanning signal terminal Scan1 and an input terminal 111 of the control sub-circuit 11, and a second terminal electrically connected to a first terminal of the second resistor Rb and a first voltage input terminal 121 of the Hall element 12; a second terminal of the second resistor Rb is electrically connected to a first level terminal V1 and a first terminal of the third resistor Rc; the control sub-circuit 11 has an output terminal 112 electrically connected to a first terminal of the strain resistor Rd, and a control terminal 113 electrically connected to a second scanning signal terminal Scan2; a second terminal of the strain resistor Rd is electrically connected to a second terminal of the third resistor Rc and a second voltage input terminal 122 of the Hall element 12; and a voltage output terminal 123 of the Hall element 12 is electrically connected to an inductive voltage output terminal Vout.

The control sub-circuit 11 is configured to transmit a first scanning signal at the first scanning signal terminal Scan1 to said first terminal of the strain resistor Rd under control of a second scanning signal at the second scanning signal terminal Scan2.

When the strain resistor Rd is not stress-deformed, a resistance value of the first resistor Ra, a resistance value of the second resistor Rb, a resistance value of the third resistor Rc, and a resistance value of the strain resistor Rd satisfy the following formula:

$$R1/R2=Rf/R3,$$

where R1 is the resistance value of the first resistor Ra; R2 is the resistance value of the second resistor Rb; R3 is the resistance value of the third resistor Rc; and Rf is the resistance value of the strain resistor Rd.

In a case of satisfying the above relationship among the resistance values of the resistors, when the control sub-circuit transmits the first scanning signal at the first scanning signal terminal to said first terminal of the strain resistor and the strain resistor is not stress-deformed, bridge balancing is achieved, and no potential difference is generated between the first voltage input terminal and the second voltage input terminal of the Hall element. When it is detected that the strain resistor is stress-deformed due to a touch, a potential difference exists between the first voltage input terminal and the second voltage input terminal of the Hall element, a voltage may be detected at the output terminal of the Hall element, and then occurrence of the touch and a position where the touch occurs are determined by analysis according to the detected voltage. With the touch control circuit according to the embodiment described above, a touch action may be determined by analysis, and the touch control circuit is not easily affected by ambient light or ambient temperature. Therefore, the touch display panel may have improved accuracy during touch sensing.

In one embodiment, the first level terminal may be at a low level. As an example, the first level terminal may be grounded. It should be understood that a potential difference between a level at the first level terminal and a level which may be provided by the first scanning signal terminal Scan1 should enable the Hall element 12 to have sufficient current to flow between the first level terminal and the first scanning signal terminal Scan1 when Rd is stress-deformed. In the present embodiment, the first scanning signal provided to the first scanning signal terminal Scan1 is at a high level.

Alternatively, in another embodiment, the first level terminal may be at a high level. Accordingly, the first scanning signal provided to the first scanning signal terminal Scan1 is at a low level.

Figure 2:
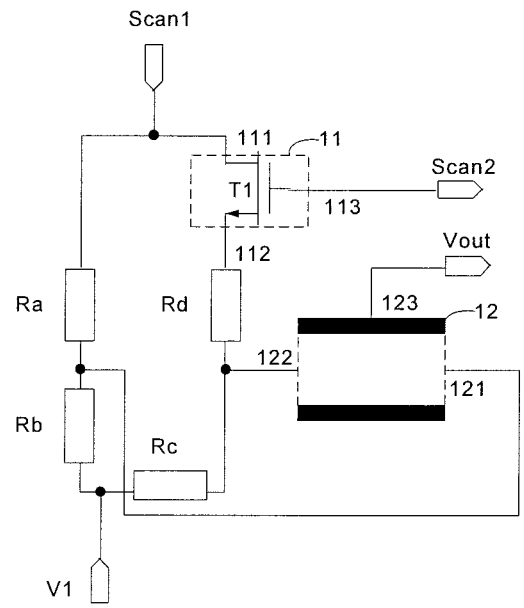
FIG. 2 is a schematic circuit diagram of a touch circuit according to an embodiment of the present disclosure.

As shown in FIG. 2 in conjunction with FIG. 1, the control sub-circuit in FIG. 1 may be a thin film transistor T1.

Here, the thin film transistor T1 has one of a source and a drain acting as the input terminal 111 of the control sub-circuit 11, the other of the source and the drain acting as the output terminal 112 of the control sub-circuit 11, and a gate acting as the control terminal 113 of the control sub-circuit 11.

In an embodiment of the present disclosure, the thin film transistor T1 may be an N-type thin film transistor which is turned on when a gate thereof is at a high level, or may be a P-type thin film transistor which is turned on when a gate thereof is at a low level. As an example, in FIG. 2, the description is made by taking the thin film transistor T1 being an N-type thin film transistor as an example.

Figure 3:
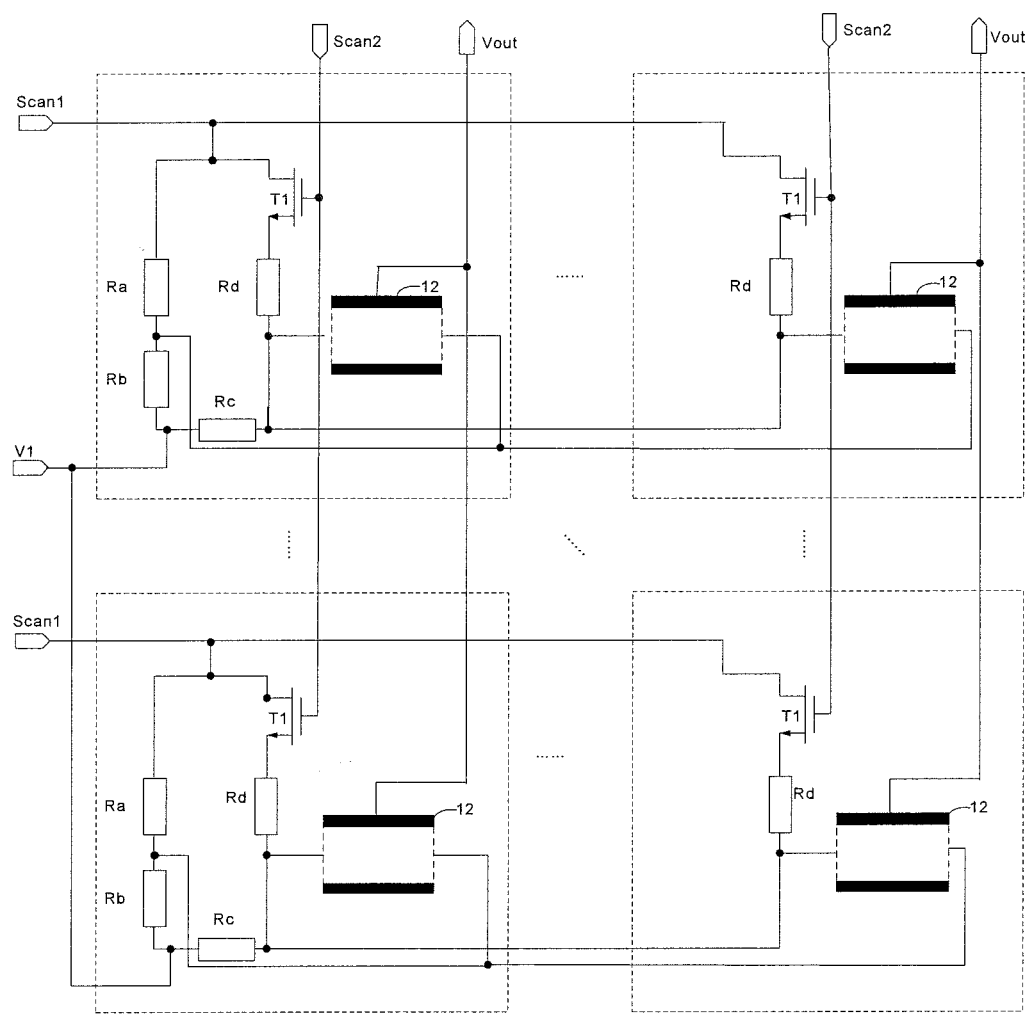
FIG. 3 is a schematic circuit diagram of a touch array circuit according to an embodiment of the present disclosure.

FIG. 3 illustrates a touch array circuit according to an embodiment of the present disclosure. The touch array circuit comprises a plurality of touch circuits as shown in FIG. 2 which are arranged in an array.

As shown in FIG. 3, in one embodiment, in the touch array circuit, the same row of touch circuits in the array share a first scanning signal terminal Scan1, and the same column of touch circuits in the array share a second scanning signal terminal Scan2 and an inductive voltage output terminal Vout.

In a further embodiment, all touch circuits in the touch array circuit may share a second scanning signal terminal Scan2 or receive the same second scanning signal.

As shown in FIG. 3, in one embodiment, the plurality of touch circuits in the touch array circuit share a first level terminal V1.

As shown in FIG. 3, in one embodiment, in the touch array circuit, the same row of touch circuits in the array share a first resistor Ra, a second resistor Rb, and a third resistor Rc.

Figure 4:
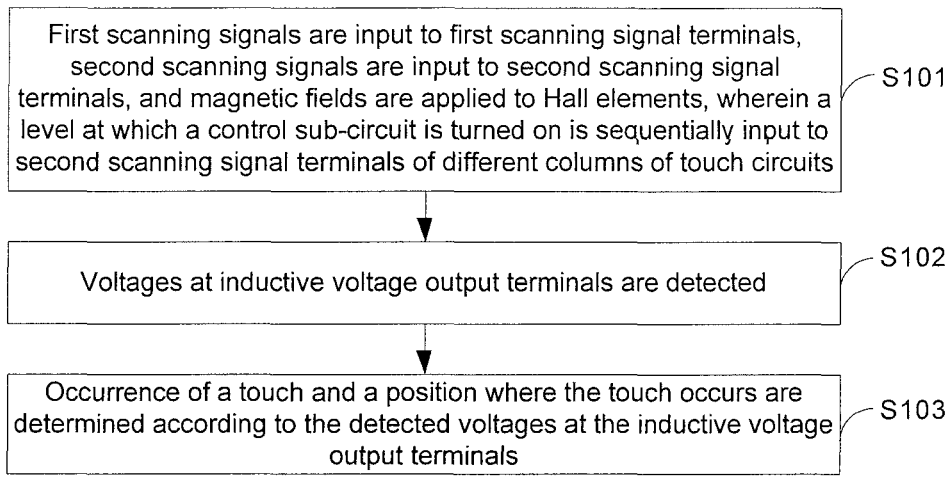
FIG. 4 is a flowchart of steps of a method for performing touch detection on a touch array circuit according to an embodiment of the present disclosure.

As shown in FIG. 4, illustrated is a method for performing touch detection on a touch array circuit (for example, the touch array circuit shown in FIG. 3) according to an embodiment of the present disclosure. The method may comprise the following steps S101-S103.

In S101, first scanning signals are input to first scanning signal terminals, second scanning signals are input to second scanning signal terminals, and magnetic fields are applied to Hall elements. Here, a level at which a control sub-circuit is turned on is sequentially input to second scanning signal terminals of different columns of touch circuits.

In one embodiment, applying a magnetic field to Hall elements comprises applying a magnetic field to a Hall element corresponding to a second scanning signal terminal to which the level at which the control sub-circuit is turned on is being input.

In S102, voltages at inductive voltage output terminals are detected.

In S103, occurrence of a touch and a position where the touch occurs are detected according to the detected voltages at the inductive voltage output terminals.

Although the direction of the applied magnetic field is not defined herein, those skilled in the art would understand that the applied magnetic field should be able to act on the current flow in the Hall element so as to generate the inductive voltage at least partially in the direction towards the inductive voltage terminal. For example, the direction of the magnetic field may be perpendicular to both the direction of the current flow and the direction of the inductive voltage.

As an example, an operating principle of the touch array circuit shown in FIG. 3 and the method for performing touch detection on a touch array circuit shown in FIG. 4 will be described below with reference to a timing state diagram shown in FIG. 5. Here, the first level terminal V1 in FIG. 3 provides a low level VGL. At this time, a potential difference may be generated across a Hall element only when a corresponding first scanning signal terminal inputs a high level, thereby enabling a touch to be sensed. Alternatively, in other embodiments, the first level terminal V1 may provide a high level VGH. At this time, a potential difference is generated across the Hall element only when the corresponding first scanning signal terminal inputs a low level, thereby enabling the touch to be sensed.

In FIG. 3, the description is made by taking the thin film transistor T1 being an N-type thin film transistor which is turned on when a gate thereof inputs a high level as an example. It should be understood that the thin film transistor T1 may also be a P-type thin film transistor.

As an example, it is assumed that the array in the touch array circuit shown in FIG. 3 comprises n rows and m columns, where m and n are both positive integers.

Figure 5:
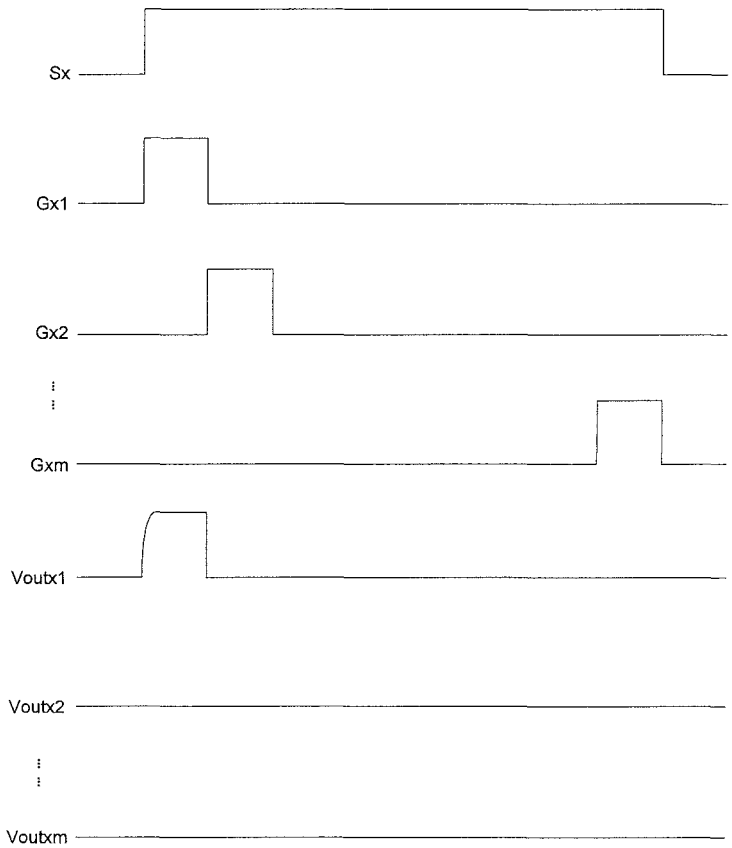
FIG. 5 is a timing diagram of various signals in a touch array circuit according to an embodiment of the present disclosure.

FIG. 5 illustrates a first scanning signal Sx at a first scanning signal terminal electrically connected to an $x^{th}$ row (the $x^{th}$ row may be any of the n rows) of touch circuits in the array, a second scanning signal Gx1 at a second scanning signal terminal electrically connected to a touch circuit in the $x^{th}$ row and a first column in the array, a second scanning signal Gx2 at a second scanning signal terminal electrically connected to a touch circuit in the $x^{th}$ row and a second column in the array, a second scanning signal Gxm at a second scanning signal terminal electrically connected to a touch circuit in the $x^{th}$ row and an $m^{th}$ column in the array, a voltage Voutx1 at an inductive voltage output terminal electrically connected to the touch circuit in the $x^{th}$ row and the first column in the array, a voltage Voutx2 at an inductive voltage output terminal electrically connected to the touch circuit in the $x^{th}$ row and the second column in the array, and a voltage Voutxm at an inductive voltage output terminal electrically connected to the touch circuit in the $x^{th}$ row and the $m^{th}$ column in the array.

During a time period in which the first scanning signal Sx at the first scanning signal terminal electrically connected to the $x^{th}$ row of touch circuits in the array is at a high level, a control sub-circuit in each of touch circuits in the $x^{th}$ row and the first column to the $m^{th}$ column transmits the first scanning signal Sx to a first terminal of a strain resistor Rd under control of a second scanning signal in a sequential manner (that is, a thin film transistor T1 is turned on under control of the second scanning signal at a high level, so that the first scanning signal Sx is transmitted to said first terminal of the strain resistor Rd.) When the first scanning signal Sx is transmitted to said first terminal of the strain resistor Rd, a magnetic field is applied to a Hall element of the touch circuit (as an example, a thin film transistor T1 in the touch circuit in the $x^{th}$ row and the first column transmits the first scanning signal Sx to a first terminal of a strain resistor Rd under control of the second scanning signal Gx1, and when the thin film transistor T1 in the touch circuit in the $x^{th}$ row and the first column transmits the first scanning signal Sx to said first terminal of the strain resistor Rd, a magnetic field is applied to a Hall element of the touch circuit.) Thus, when Rd is not stress-deformed, since R1/R2=Rf/R3 (where R1 is a resistance value of a first resistor Ra; R2 is a resistance value of a second resistor Rb; R3 is a resistance value of a third resistor Rc; and Rf is a resistance value of the strain resistor Rd), a first voltage input terminal 121 of the Hall element 12 has the same voltage value as that of a second voltage input terminal 122 of the Hall element 12, there is no current generated in the Hall element, and therefore no inductive electric field is generated in the Hall element, and the voltage output terminal 123 of the Hall element 12 has no output voltage, that is, a voltage output at an inductive voltage output terminal Vout is 0 (for example, Voutx2 in FIG. 5 is a voltage output at an inductive voltage output terminal Vout of a touch circuit in the $x^{th}$ row and the second column in a case that a strain resistor Rd in the touch circuit is not stress-deformed; and Voutxm in FIG. 5 is a voltage output at an inductive voltage output terminal Vout of a touch circuit in the $x^{th}$ row and the $m^{th}$ column in a case that a strain resistor Rd in the touch circuit is not stress-deformed). When Rd is stress-deformed, since a resistance value Rf of Rd may change, there is a potential difference between the first voltage input terminal 121 of the Hall element 12 and the second voltage input terminal 122 of the Hall element 12, current is generated in the Hall element. Because an appropriate magnetic field is applied on the Hall element 12, the current will generate an inductive electric field in a direction perpendicular to a plane constructed by the direction of the current and the direction of the magnetic field, and therefore an inductive electric field may be generated at the voltage output terminal 123 of the Hall element 12, that is, the voltage output at the inductive voltage output terminal Vout is not 0 (Voutx1 in FIG. 5 is a voltage output at an inductive voltage output terminal Vout of a touch circuit in the $x^{th}$ row and the first column in a case that a strain resistor Rd in the touch circuit is stress-deformed.) In practical applications, when the voltage output at the inductive voltage output terminal Vout is not 0, presence of a touch and a position where the touch occurs may be determined according to the voltage at the inductive voltage output terminal Vout of the touch control circuit. In one embodiment, the position where the touch occurs may be determined according to a timing of detecting the voltage at the inductive voltage output terminal Vout of the touch circuit, a timing of the first scanning signal, and a timing of the second scanning signal.

It should be illustrated that the method shown in FIG. 4 may be used for determining a touch using an object (for example, a finger or other parts of a person) which does not generate a specific magnetic field (a persistent magnetic field having certain intensity), wherein stress deformation generated by the object on the strain resistor Rd causes a potential difference across the Hall element, thereby enabling an output of the Hall element to be detected by applying a magnetic field, and further determining presence of a touch.

Figure 6:
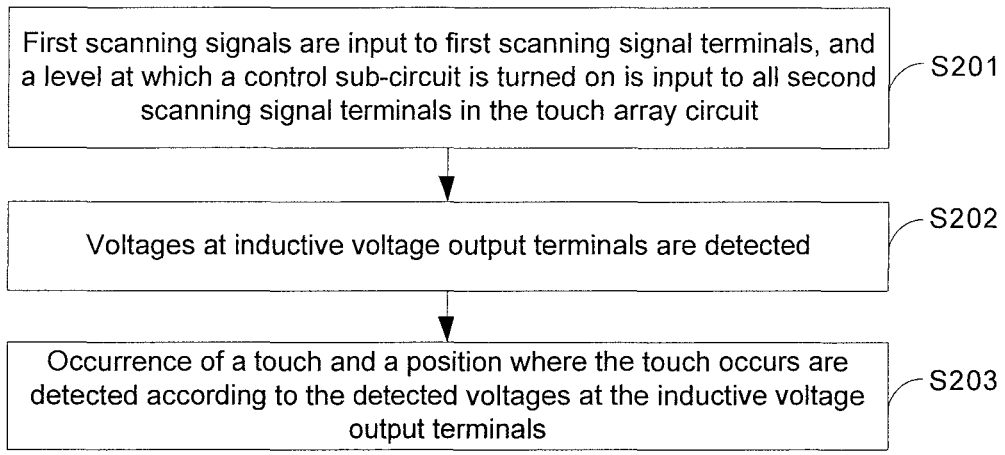
FIG. 6 is a flowchart of steps of a method for performing touch detection on a touch array circuit according to another embodiment of the present disclosure.

As shown in FIG. 6, illustrated is a method for performing touch detection on a touch array circuit (for example, the touch array circuit shown in FIG. 3) according to an embodiment of the present disclosure. The method may comprise the following steps S201-S203.

In S201, first scanning signals are input to first scanning signal terminals, and a level at which a control sub-circuit is turned on is input to all second scanning signal terminals in the touch array circuit.

In one embodiment, the step of inputting first scanning signals to first scanning signal terminals comprises sequentially inputting a level at which a potential difference may be generated across a Hall element to first scanning signal terminals of different rows of touch circuits.

In another embodiment, the step of inputting first scanning signals to first scanning signal terminals comprises simultaneously inputting a level at which a potential difference may be generated across a Hall element to first scanning signal terminals of all rows of touch circuits.

In S202, voltages at inductive voltage output terminals are detected.

In S203, occurrence of a touch and a position where the touch occurs are determined according to the detected voltages at the inductive voltage output terminals.

It should be understood that, the touch detected by the steps S201-S203 should be performed using an object (e.g. a magnetic pen) capable of generated specific magnetic field (a persistent magnetic field having certain intensity).

As an example, the operating principle of the touch array circuit shown in FIG. 3 and the method for performing touch detection on a touch array circuit shown in FIG. 6 will be described below with reference to a timing state diagram shown in FIG. 7. Here, the first level terminal V1 in FIG. 3 provides a low level VGL. At this time, a potential difference is generated across a Hall element only when a corresponding first scanning signal terminal inputs a high level, thereby enabling a touch to be sensed. Alternatively, in other embodiments, the first level terminal V1 may provide a high level VGH. At this time, a potential difference is generated across the Hall element only when the corresponding first scanning signal terminal inputs a low level, thereby enabling the touch to be sensed.

In FIG. 3, the description is made by taking the thin film transistor T1 being an N-type thin film transistor which is turned on when a gate thereof inputs a high level as an example. It should be understood that the thin film transistor T1 may also be a P-type thin film transistor.

As an example, it is assumed that the array in the touch array circuit shown in FIG. 3 comprises n rows and m columns, where m and n are both positive integers.

Figure 7:
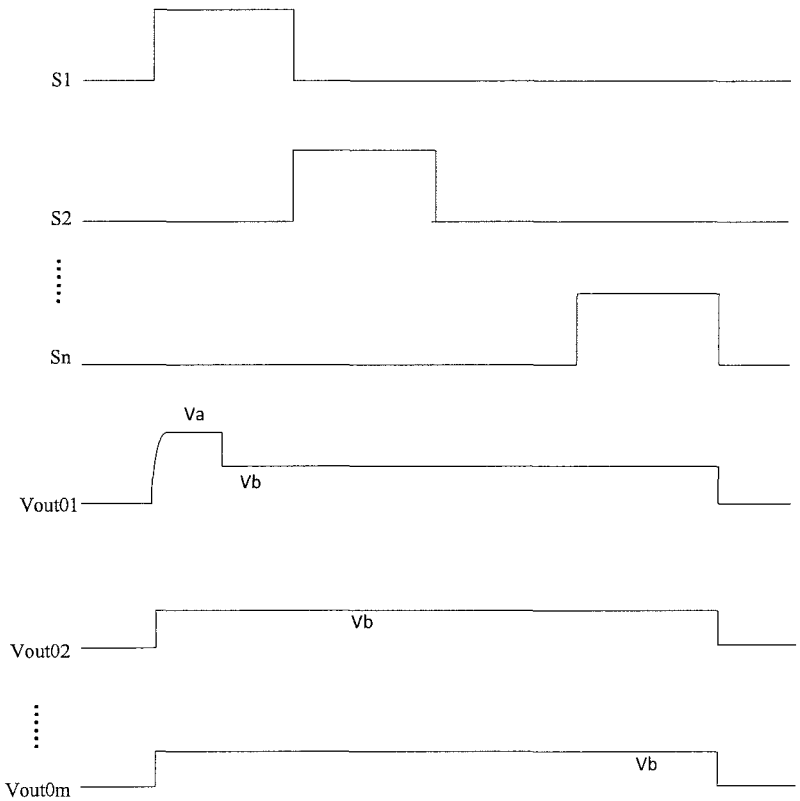
FIG. 7 is a timing diagram of various signals in a touch array circuit according to another embodiment of the present disclosure.

FIG. 7 illustrates a first scanning signal S1 at a first scanning signal terminal electrically connected to a first row of touch circuits in the array, a first scanning signal S2 at a first scanning signal terminal electrically connected to a second row of touch circuits in the array, a first scanning signal Sn at a first scanning signal terminal electrically connected to an $n^{th}$ row of touch circuits in the array, a voltage Vout01 at an inductive voltage output terminal electrically connected to a first column of touch circuits in the array, a voltage Vout02 at an inductive voltage output terminal electrically connected to a second column of touch circuits in the array, and a voltage Vout0$m$ at an inductive voltage output terminal electrically connected to an $m^{th}$ column of touch circuits in the array.

In this embodiment, a background magnetic field has been assumed on the touch circuit. However, the background magnetic field may be zero in some cases, that is, no magnetic field has been applied.

As shown in FIG. 7, first scanning signals electrically connected to various rows of touch circuits from the first row of touch circuits to the $n^{th}$ row of touch circuits in the array sequentially output a high level. In the embodiment of the present disclosure, when second scanning signals output at second scanning signal terminals electrically connected to all the touch circuits are at a high level, each of the control units in all the touch circuits may output a first scanning signal to a first terminal of a strain resistor Rd under control of a corresponding second scanning signal. Further, since all the thin film transistors T1 are turned on when the second scanning signals are at a high level in FIG. 3, all m strain resistors Rd in each row are connected in parallel between the thin film transistor T1 and the resistor Rc, the result resistance of the parallel connected resistors Rd is equal to Rf/m. When a first scanning signal terminal inputs a high level, there is a potential difference between a first voltage input terminal 121 of a Hall element 12 and a second voltage input terminal 122 of the Hall element 12, there is current in the Hall element, and therefore, under the background magnetic field, an inductive electric field may be generated in the Hall element, a voltage output terminal 123 of the Hall element 12 outputs a voltage Vb, and a voltage output at an inductive voltage output terminal Vout is Vb; and when the Hall element has electromagnetic contact (for example, an electromagnetic pen approaches or contacts the Hall element), the magnetic field applied on the Hall element becomes stronger, which leads to an stronger inductive electric field in the Hall element, which causes a voltage jump in the Hall element. For example, as shown in FIG. 7, when a Hall element 12 in a touch circuit in the first row and the first column of the array has electromagnetic contact, a voltage Vout01 at an inductive voltage output terminal electrically connected to the first column of touch circuits in the array is Va, and when there is no electromagnetic contact, the voltage Vout01 at the inductive voltage output terminal is Vb. That is, the voltage output at the inductive voltage output terminal Vout changes from Va to Vb. Therefore, in practical applications, when there is a jump in a voltage output at the inductive voltage output terminal Vout, presence of a touch and a position where the touch occurs are determined according to a timing of detecting the voltage at the inductive voltage output terminal Vout of the touch circuit and a timing of the first scanning signal. In one embodiment, the position where the touch occurs may be determined according to the timing of detecting the voltage at the inductive voltage output terminal Vout of the touch circuit and the timing of the first scanning signal.

It should be illustrated that the method shown in FIG. 6 may be used for detecting a touch using an object (for example, an electromagnetic pen) which may generate a specific magnetic field (a persistent magnetic field having certain intensity), wherein a potential difference is generated across Hall elements in each row of touch circuits sequentially due to inputs on first scanning signal lines, and when the object which may generate the magnetic field approaches a specific Hall element, a voltage jump may be detected at an output terminal of the Hall element, thereby determining presence of a touch.

The embodiments of the present disclosure provide a display panel, which may comprise the touch array circuit shown in FIG. 3.

The above description is only specific embodiments of the present disclosure, and the protection scope of the present disclosure is not limited thereto. Changes or substitutions which may be easily reached by any person skilled in the art within the technical scope of the present disclosure shall be covered within the protection scope of the present disclosure. Therefore, the protection scope of the present disclosure should be determined by the protection scope of the claims.

We claim:

1. A touch circuit, comprising a first resistor, a second resistor, a control sub-circuit, a third resistor, a strain resistor and a Hall element, wherein
    a first terminal of the first resistor is electrically connected to a first scanning signal terminal and an input terminal of the control sub-circuit, and a second terminal of the first resistor is electrically connected to a first terminal of the second resistor and a first voltage input terminal of the Hall element,
    a second terminal of the second resistor is electrically connected to a first level terminal and a first terminal of the third resistor,
    an output terminal of the control sub-circuit is electrically connected to a first terminal of the strain resistor, and a control terminal of the control sub-circuit is electrically connected to a second scanning signal terminal,
    a second terminal of the strain resistor is electrically connected to a second terminal of the third resistor and a second voltage input terminal of the Hall element, and
    a voltage output terminal of the Hall element is electrically connected to an inductive voltage output terminal.

2. The touch control circuit according to claim 1, wherein when the strain resistor is not stress-deformed, resistance values of the first resistor, the second resistor, the third resistor, and the strain resistor satisfy the following formula:

$$R1/R2 = Rf/R3,$$

wherein R1 is the resistance value of the first resistor, R2 is the resistance value of the second resistor, R3 is the resistance value of the third resistor, and Rf is the resistance value of the strain resistor.

3. The touch control circuit according to claim 1, wherein the control sub-circuit comprises a thin film transistor,
    wherein the thin film transistor has one of a source and a drain acting as the input terminal of the control sub-circuit, the other of the source and the drain acting as the output terminal of the control sub-circuit, and a gate acting as the control terminal of the control sub-circuit.

4. A touch array circuit, comprising a plurality of touch circuits according to claim 1 which are arranged in an array.

5. The touch array circuit according to claim 4, wherein
    touch circuits in a same row of the array connect to a common first scanning signal terminal; and
    touch circuits in a same column of the array connect to a common second scanning signal terminal and a common inductive voltage output terminal.

6. The touch array circuit according to claim 4, wherein the plurality of touch circuits in the touch array circuit connect to a common first level terminal.

7. The touch array circuit according to claim 4, wherein touch circuits in a same row of the array connect to a common first resistor, a common second resistor, and a common third resistor.

8. A method for performing touch detection on the touch array circuit according to claim 4, comprising:
    inputting first scanning signals to first scanning signal terminals, sequentially inputting a level at which a control sub-circuit is turned on to second scanning signal terminals of different columns of touch circuits, and applying magnetic fields to Hall elements;
    detecting voltages at inductive voltage output terminals; and
    determining occurrence of a touch and a position where the touch occurs according to the detected voltages at the inductive voltage output terminals.

9. The method according to claim 8, wherein the step of applying magnetic fields to Hall elements comprises applying a magnetic field to a Hall element corresponding to a second scanning signal terminal to which the level at which the control sub-circuit is turned on is being input.

10. A method for performing touch detection on the touch array circuit according to claim 4, comprising:
    inputting first scanning signals to first scanning signal terminals, and inputting a level at which a control sub-circuit is turned on to all second scanning signal terminals in the touch array circuit;
    detecting voltages at inductive voltage output terminals; and
    determining occurrence of a touch and a position where the touch occurs according to the detected voltages at the inductive voltage output terminals.

11. The method according to claim 8, wherein the step of inputting first scanning signals to first scanning signal terminals comprises sequentially inputting a level at which a potential difference is generated across a Hall element to first scanning signal terminals of different rows of touch circuits.

12. A display panel comprising the touch array circuit according to claim 4.

13. A touch array circuit, comprising a plurality of touch circuits according to claim 2 which are arranged in an array.

14. The touch array circuit according to claim 13, wherein
touch circuits in a same row of the array connect to a common first scanning signal terminal, and connect to a common first resistor, a common second resistor, and a common third resistor;
touch circuits in a same column of the array connect to a common second scanning signal terminal and a common inductive voltage output terminal; and
the plurality of touch circuits in the touch array circuit connect to a common first level terminal.

15. A method for performing touch detection on the touch array circuit according to claim 13, comprising:
inputting first scanning signals to first scanning signal terminals, sequentially inputting a level at which a control sub-circuit is turned on to second scanning signal terminals of different columns of touch circuits, and applying magnetic fields to Hall elements;
detecting voltages at inductive voltage output terminals; and
determining occurrence of a touch and a position where the touch occurs according to the detected voltages at the inductive voltage output terminals.

16. A method for performing touch detection on the touch array circuit according to claim 13, comprising:
inputting first scanning signals to first scanning signal terminals, and inputting a level at which a control sub-circuit is turned on to all second scanning signal terminals in the touch array circuit;
detecting voltages at inductive voltage output terminals; and
determining occurrence of a touch and a position where the touch occurs according to the detected voltages at the inductive voltage output terminals.

17. A touch array circuit, comprising a plurality of touch circuits according to claim 3 which are arranged in an array.

18. The touch array circuit according to claim 17, wherein
touch circuits in a same row of the array connect to a common first scanning signal terminal, and connect to a common first resistor, a common second resistor, and a common third resistor;
touch circuits in a same column of the array connect to a common second scanning signal terminal and a common inductive voltage output terminal; and
the plurality of touch circuits in the touch array circuit connect to a common first level terminal.

19. A method for performing touch detection on the touch array circuit according to claim 17, comprising:
inputting first scanning signals to first scanning signal terminals, sequentially inputting a level at which a control sub-circuit is turned on to second scanning signal terminals of different columns of touch circuits, and applying magnetic fields to Hall elements;
detecting voltages at inductive voltage output terminals; and
determining occurrence of a touch and a position where the touch occurs according to the detected voltages at the inductive voltage output terminals.

20. A method for performing touch detection on the touch array circuit according to claim 17, comprising:
inputting first scanning signals to first scanning signal terminals, and inputting a level at which a control sub-circuit is turned on to all second scanning signal terminals in the touch array circuit;
detecting voltages at inductive voltage output terminals; and
determining occurrence of a touch and a position where the touch occurs according to the detected voltages at the inductive voltage output terminals.

* * * * *